United States Patent [19]
Köster et al.

[11] Patent Number: 5,253,931
[45] Date of Patent: Oct. 19, 1993

[54] CONTROL LOGIC FOR AN ANTI-LOCK VEHICLE BRAKE SYSTEM

[75] Inventors: Harald Köster, Hannover; Helmut Pannbacker, Hemmingen; Henrich Riedemann, Hannover, all of Fed. Rep. of Germany

[73] Assignee: WABCO Westinghouse Fahrzeugbremsen GmbH, Hannover, Fed. Rep. of Germany

[21] Appl. No.: 748,199

[22] Filed: Aug. 21, 1991

[30] Foreign Application Priority Data

Sep. 3, 1990 [DE] Fed. Rep. of Germany ....... 4027785

[51] Int. Cl.$^5$ .................................................. B60T 8/32
[52] U.S. Cl. ........................................ 303/95; 180/197; 180/244; 303/100
[58] Field of Search ........................ 303/100–110, 303/93, 95, 97; 364/426.02; 180/197, 233, 242, 243, 244, 247

[56] References Cited

U.S. PATENT DOCUMENTS

| | | | |
|---|---|---|---|
| 3,953,080 | 4/1976 | Bremer | 303/107 |
| 4,660,896 | 4/1987 | Matsuda | 303/97 |
| 4,702,337 | 10/1987 | Burckhardt et al. | 303/93 |
| 4,807,133 | 2/1989 | Shimanuki et al. | 303/95 |
| 4,849,890 | 7/1989 | Inoue et al. | 303/95 |
| 4,982,806 | 1/1991 | Yoshizawa et al. | 180/197 |

*Primary Examiner*—Matthew C. Graham
*Attorney, Agent, or Firm*—Horst M. Kasper

[57] ABSTRACT

An automatic control logic for an anti-lock protected vehicle braking plants is provided for all-terrain operation. In this case, the standard automatic control logic for road operation is switched, by the driver with an all-terrain switch (13) to a special automatic control logic for all-terrain operation. The special automatic control logic generates time periods, during which a short-term blocking of the automatically controlled wheels (12) is intentionally permitted. The locking time periods have a time duration of about 240 ms. The braking distance of the vehicle in cross-country terrain is shortened while a sufficient cornering force remains based on the all-terrain automatic control logic.

41 Claims, 2 Drawing Sheets

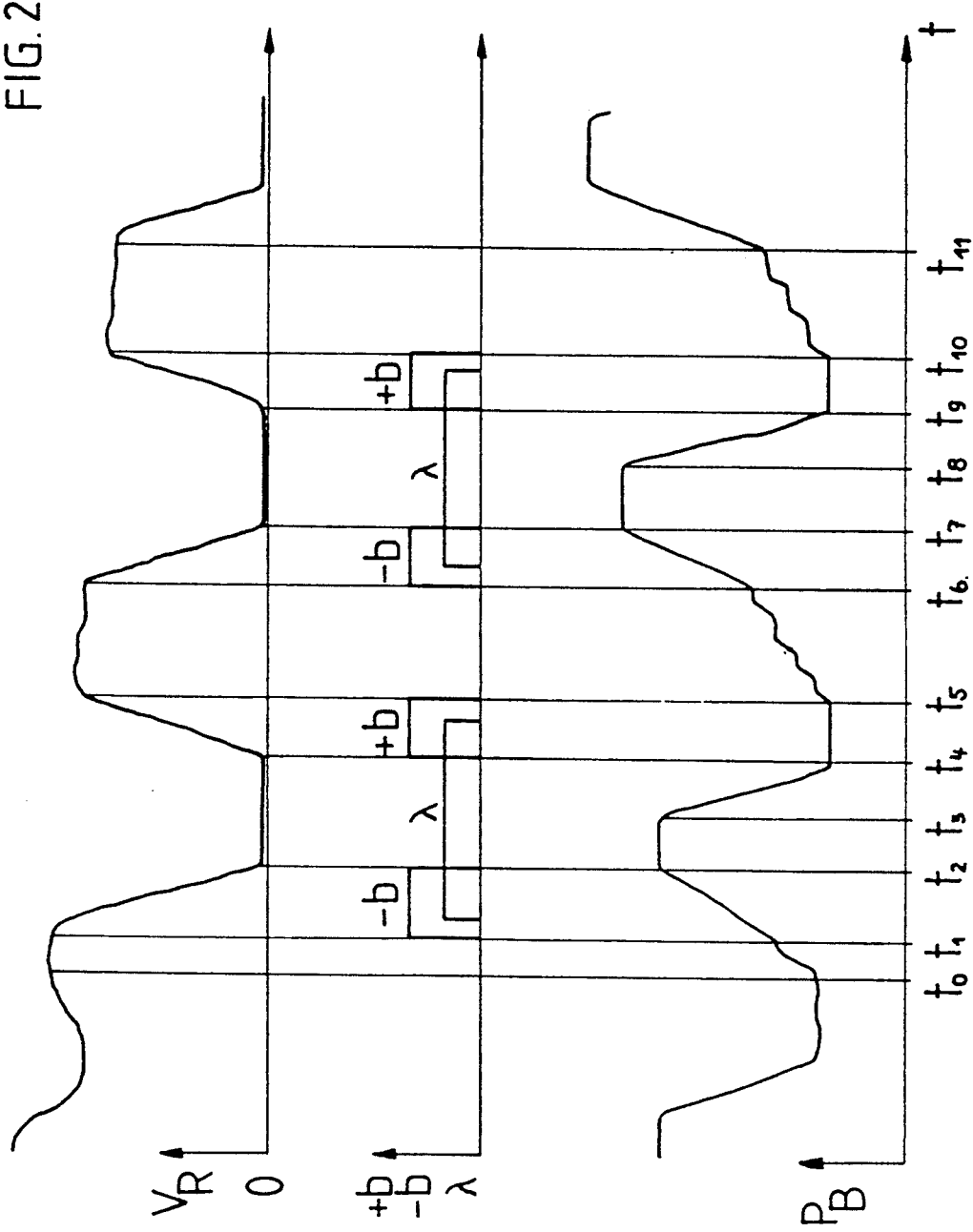

CONTROL LOGIC FOR AN ANTI-LOCK VEHICLE BRAKE SYSTEM

BACKGROUND OF THE INVENTION

1. Field of the Invention

The invention relates to an automatic control logic for an anti-lock protected vehicle braking system where signals for the wheel deceleration, the wheel acceleration, and the wheel slip are generated within an electronic circuit.

2. Brief Description of the Background of the Invention Including Prior Art

Standard anti-lock systems (ALS) are optimized for road operation and allow a minimal braking distance on roads with sufficient cornering force. However, it has been found that such anti-lock systems can require a longer braking distance than would be the case with continuously locked wheels, in case of special, rarely occurring road surface conditions such as gravel, broken stone, crushed stone, roadstone, scree material, detritus, debris, pebbles, boulders, loose ground, slush, mud, mush, high snow. A reason for this is that in case of such road surfaces, which are also frequently encountered on country roads, cross country and territorial situations, a 'wedge' is formed of the surface material in front of the locked wheels, which causes a substantial braking. It is a disadvantage that the vehicle can no longer be steered while in such a locked braking state.

SUMMARY OF THE INVENTION

1. Purposes of the Invention

It is an object of the present invention to furnish a vehicle with an anti-lock system suitable for braking on loose or uneven ground surfaces with a deceleration as high as possible under a substantial retention of cornering, lateral guidance and steerability, respectively.

It is another object of the present invention to provide an anti-lock braking system for motor vehicles suitable for unstable and soft ground surface conditions.

It is yet a further object of the invention to provide an anti-lock system for motor vehicles which fully maintains steerability of the vehicle independent of poor road surface conditions.

It is a further object of the present invention to meet the requirements of category 1 of the European Community Regulation for an automatic locking prevention system.

These and other objects and advantages of the present invention will become evident from the description which follows.

2. Brief Description of the Invention

According to the present invention there is provided for a method for controlling the brakes of an anti-lock protected vehicle braking system. Signals are generated within an electronic device for a wheel deceleration ($-b$), a wheel acceleration ($+b$), and a wheel slip ($\lambda$). A special automatic control logic is switched on with an all-terrain switch, and is furnished for all-terrain operation. Time periods are generated with the special automatic control logic during which a short-term locking of the automatically controlled wheels occurs based on signals furnished by the special automatic control logic.

A microprocessor contained in the special automatic control logic can be programmed.

The time periods for the locking generated by the special automatic control logic can be set to a constant time duration. The time periods for the locking can amount from about 100 to 400 ms, and preferably from about 200 to 300 ms.

An effectiveness of the special automatic control logic for all-terrain operation can be limited to a speed below a preset reference vehicle speed such that the standard automatic control logic for road operation can remain effective above the preset reference speed. The preset reference vehicle speed can amount to from about 35 to 45 km/h.

A brake pressure in a wheel brake cylinder can be maintained during an occurrence of a wheel deceleration signal ($-b$). A pressure maintenance phase of the brake pressure can be entered in the wheel brake cylinder for a time period of from about 100 to 150 ms following to a drop of the wheel deceleration signal ($-b$). The brake pressure in the wheel brake cylinder can be reduced quickly after expiration of the pressure maintenance phase. The brake pressure in the wheel brake cylinder can then be maintained at a reduced level for a certain time period. Thereupon, the brake pressure in the wheel brake cylinder can be slowly built up by pulsing the brake pressure to an occurrence of the next wheel deceleration signal.

A complete brake pressure can be entered into the wheel brake cylinder in case of a wheel speed of below about 10 to 20 km/h. The anti-lock automatic control can be blocked below a wheel speed of from about 10 to 20 km/h.

A modified individual control connection to the front wheels can be suspended.

An anti-lock system warning lamp can be powered for time intervals during which an all-terrain switch can be switched to ON.

A longitudinal differential blocking can be kept switched on in an all-wheel drive vehicle while an all-terrain switch can be placed into an ON-state.

According to the present invention there is further provided for an automatic control circuit for an anti-lock protected vehicle braking system. A wheel speed sensor has an output and monitors the wheel speed and delivers a signal corresponding to the wheel speed through said output. A signal processing stage has an input connected to the output of the wheel speed sensor for generating signals corresponding to a wheel deceleration ($-b$), a wheel acceleration ($+b$), and a wheel slip ($\lambda$). A special automatic control circuit is adapted to control an all-terrain operation. An all-terrain switch is connected to the signal processing stage. The driver can switch on the special automatic control circuit with an all-terrain switch. Control means actuate the special automatic control circuit such that time periods are generated during which a short-term locking of an automatically controlled wheel occurs.

The time periods, provided by the special automatic control circuit for the locking, can exhibit a constant time duration. The time periods for the locking can amount to a time period from about 100 to 400 ms, and preferably from about 200 to 300 ms.

The special automatic control circuit for all-terrain operation can become effective only below a preset reference vehicle speed. A standard automatic control logic for road operation can remain effective above the preset reference speed. The preset reference vehicle speed can amount to from about 35 to 45 km/h.

A valve can be connected to the signal processing stage and can be actuated by the signal processing stage. Wheel brake cylinders can be connected to the valve such that a brake pressure can be maintained in the wheel brake cylinders during the occurrence of a wheel deceleration signal (−b) in the signal processing stage. A pressure maintenance phase can be furnished by the signal processing unit amounting to a time period of from about 100 to 150 ms following a drop of the wheel deceleration signal (−b). After expiration of the pressure maintenance phase, the pressure can be quickly reduced based on signals from the signal processing stage and can then be maintained at a reduced level, and can thereupon be slowly built by pulsing up to the occurrence of the next wheel deceleration signal.

The signal processing stage can induce a feeding of the complete brake pressure into the wheel brake cylinder in case of a wheel speed of below about 10 to 20 km/h. The anti-lock automatic control can be blocked for wheel speeds lower than a defined wheel speed of between about 10 to 20 km/h.

A modified individual control connection to the front wheels can be suspended.

An all-terrain switch can activate the special automatic wheel control circuit. Preferably, an anti-lock system warning lamp is connected to the all-terrain switch. The warning lamp is to be powered on during time intervals where the all-terrain switch is in an ON-state.

A longitudinal differential blocking can remain switched on in case the actuated all-terrain switch is turned on in an all-wheel drive vehicle.

Standard anti-lock automatic control systems control a wheel slip of about 20% and prevent a locking of the wheel. In contrast, the present invention system intentionally generates a short-term locking of the wheels of a vehicle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 2 is a view of a schematic diagram, illustrating the wheel speed, the automatic control signals, and the brake pressure drawn relative to time scale on the abscissa according to the cross-country automatic control logic of the invention.

DESCRIPTION OF THE INVENTION AND PREFERRED EMBODIMENT

Figure 1:
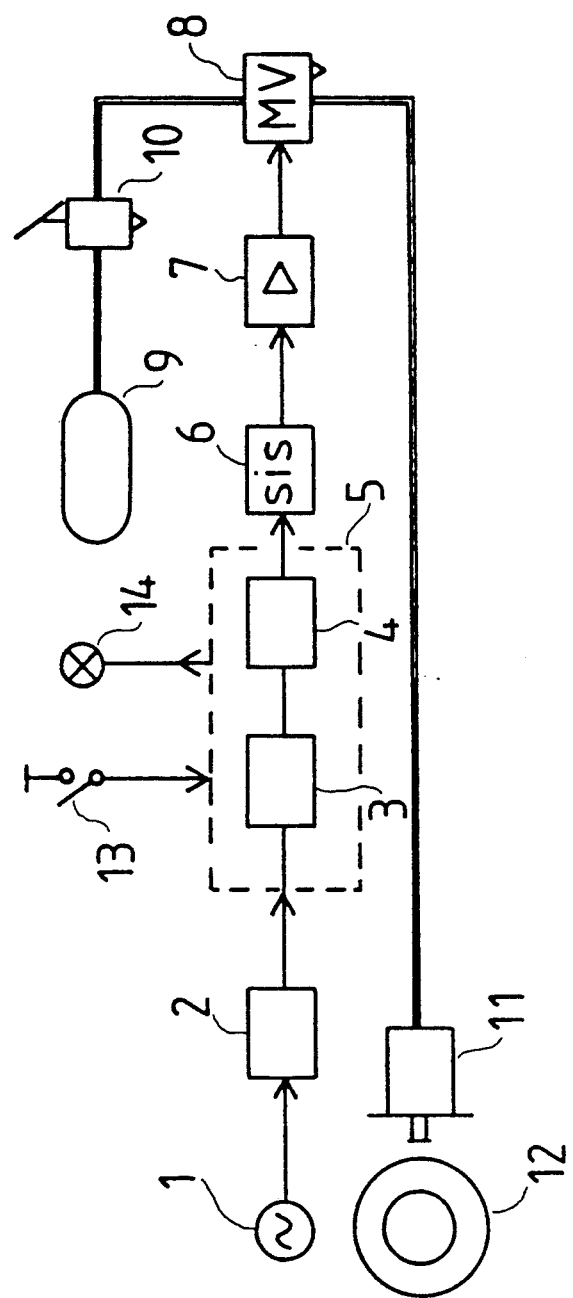
FIG. 1 is a view of a block circuit diagram of an anti-lock braking system with an electronic part and a pneumatic part.

The present invention provides for an automatic control logic for an anti-lock protected vehicle braking system. Signals are generated within the electronic device for a wheel deceleration −b, a wheel acceleration +b, and a wheel slip λ. An additional special automatic control logic and a special programming part, respectively, is furnished for an all-terrain operation. The special automatic control logic can be switched on by the driver with an all-terrain switch 13. The special automatic control logic is formed such that time periods are generated during which a short-term locking of the automatically controlled wheels 12 occurs.

The time periods for the locking can exhibit a constant time duration. The time periods for the locking can amount to a time period from about 100 to 400 ms, and preferably from about 200 to 300 ms.

The special automatic control logic for an all-terrain operation can become effective only below a preset reference vehicle speed. The standard automatic control logic for road operation can remain effective above the preset reference speed. The vehicle speed can amount to from about 35 to 45 km/h.

A brake pressure can be maintained in the wheel brake cylinders during the occurrence of a wheel deceleration signal −b.

A pressure maintenance phase can be entered for a time period of from about 100 to 150 ms following to a drop of the wheel deceleration signal −b. After expiration of the pressure maintenance phase, the pressure can be quickly reduced and maintained at a reduced level and thereupon can be slowly built by pulsing up to the occurrence of the next wheel deceleration signal.

The complete brake pressure can be entered into the wheel brake cylinder in case of a wheel speed of below about 10 to 20 km/h. The anti-lock automatic control can be blocked at a wheel speed of between about 10 to 20 km/h.

A modified individual control connection to the front wheels can be suspended.

An anti-lock system warning lamp 14 can be powered in time intervals during an ON state of the all-terrain switch 13.

The longitudinal differential blocking can remain switched on in case of an actuated all-terrain switch 13 for all-wheel drive vehicles.

An anti-lock system for motor vehicles is schematically illustrated in FIG. 1 as a block circuit diagram.

The electronic part of the anti-lock system comprises a wheel speed sensor 1, which scans the rotation behavior of a vehicle wheel 12. The signals of the sensor 1 are digitalized in a signal processing stage 2. Acceleration signals +b, deceleration signals −b, and slip signals λ are formed in a following electronic stage 3 from the wheel speed signal.

A vehicle reference speed is necessary for a generation of the slip signals, where the vehicle reference speed is recreated with the speed of the remaining wheels. A logic stage 4 follows, wherein automatic control signals are formed from the recited automatic control signals for a solenoid valve 8. A following fail-safe circuit 6 monitors the automatic control signals with respect to freedom from errors.

The device components 3 and 4 can also be represented by a microprocessor 5. The recited automatic control signals and the solenoid valve control signals are in this case not generated with a discrete circuit of hardware, but based on a corresponding computer operated by a program or software.

A final stage amplifier 7 serves for amplifying the valve control signals. The logic of the device component 4 and the program of the microprocessor 5, respectively, can be switched to a special terrain logic with a terrain switch 13. The performed switching can be recognized in an anti-lock braking system signal lamp 14. The anti-lock braking system signal lamp 14 is powered in case of an all-terrain operation preferably such as to exhibit an alternatingly flashing operation.

The pneumatic or hydraulic part of the anti-lock braking system comprises a pressure agent storage container 9, a brake valve 10, the automatic control solenoid valve 8, and a brake cylinder 11. The pressure agent is entered into the brake cylinder 11 or the pressure agent is ventilated by the solenoid valve 8 and a pressure decrease is caused, respectively, independent of the actuation of the brake valve 10 by the driver based on the solenoid valve 8 controlled by the electronics. The solenoid valve 8 normally exhibits three positions, which allow to increase the pressure, to maintain the pressure, or to decrease the pressure.

The mode of operation of the invention of the specific automatic control logic for all-terrain braking operation is illustrated in the following in more detail based on the diagram illustrated in FIG. 2. The course of the wheel speed $V_R$ is plotted in the upper part of FIG. 2, while a controlled braking occurs during the all-terrain operation versus time t.

The automatic control signals, wheel acceleration $+b$, wheel deceleration $-b$, and wheel slip $\lambda$ are plotted in the center part of FIG. 2 versus time t.

The brake pressure $P_B$ of the braked wheel is plotted versus time t in the lower part of FIG. 2.

The situation represented in FIG. 2 shows a speed of a vehicle operating on an all-terrain surface during an anti-lock braking system controlled braking process.

In order to provide a more effective braking, the driver switches the all-terrain switch 13 at the point in time $t_0$. The switching to the invention all-terrain automatic control is thereby performed within the electronic device of the anti-lock braking system. The braked wheel is decelerated at the point in time $t_1$ to such an extent that a $-b$ signal appears (FIG. 2). Thereupon, the brake pressure is quickly increased during the time period $t_1$ through $t_2$. This occurs in contrast to standard anti-lock system brakings, where the brake pressure is quickly decreased upon occurrence of a $-b$ signal. The invention brake pressure increase results in a locking of the vehicle wheel 12 at the point in time $t_2$. Accordingly, the $-b$ signal drops at this moment. The brake pressure reached at the point in time $t_2$ is now maintained at the reached level over a constant time period of from about 50 to 300 milliseconds and preferably from about 100 to 150 milliseconds such as, for example, about 120 milliseconds up to the point in time $t_3$. Subsequently, the brake pressure is quickly decreased over the time period $t_3$ through $t_4$. The locking of the vehicle wheel remains up to the point in time $t_4$, which is overall about 240 ms. The wheel starts to run again upon a presence of a $\lambda$ signal based on a quick decrease of the brake pressure. This generates a $+b$ signal. The vehicle wheel is again running to full speed, corresponding to the vehicle speed, during the time period $t_4$ through $t_5$. Therefore, the $+b$ signal decreases again. At least starting with the point in time $t_5$, the brake pressure is slowly increased again, initially in pulsed stages. The thus increased brake pressure is sufficient at the point in time $t_6$ to decelerate the wheel again to such an extent that a $-b$ signal occurs. From this point in time $t_6$ on, the full brake pressure is activated by the controls. The activation of the full brake pressure results quickly in a locking of the wheel at the point in time $t_7$. In the following, the brake pressure is again maintained constant for the already recited time of, for example, 120 ms. Then, the already recited automatic control processes for the time periods $t_8$ through $t_{11}$ are repeated. The slip signal $\lambda$ occurs as soon as the wheel speed has decreased below the vehicle speed by a predetermined amount.

As can be recognized from FIG. 2, time periods with a constant brake value behavior period of from about 100 to 600 milliseconds, and preferably 200 to 300 milliseconds, such as for example about 240 ms, result for the wheel speed $V_R$, and the wheel is fully blocked through these periods. The above recited wedge effect of the loose surface material is thereby generated, by which the vehicle is particularly markedly decelerated. Based on the intermediately switched time periods, during which the wheel can run free, a sufficient cornering force of the wheel is again made possible. The automatic control frequency during the all-terrain operation is decreased versus the automatic control frequency in case of a standard anti-lock system operation and amounts to approximately one automatic control period per second.

The recited all-terrain automatic control logic is permitted to operate for safety reasons only at a vehicle speed of below about 40 km/h. If the all-terrain switch 13 is switched on already at a higher speed, then the automatic control logic automatically switches over to all-terrain operation at a limiting speed of about 40 km/h.

The full brake pressure is placed into the wheel brake cylinder and thus an anti-lock automatic control is overall locked at a vehicle speed of below about 15 km/h during the all-terrain operation. This is advantageous in order to reach a short braking distance in the last phase of the braking process. The recited speeds of 40 km/h and 15 km/h can also be changed by a reprogramming of the microprocessor 5. A preferred switching point lies between about 30 and 60 km/h as an upper limit of the invention process. The invention process automatic brake control is preferably switched off below a speed of from about 10 to 20 km/h. The governmental regulating agencies generally allow a blocking below a speed of 15 km/h.

A further feature of the all-terrain logic comprises that a so-called modified individual control logic connection of the front wheels is suspended. Such a modified individual control logic serves, in case of a standard anti-lock system braking during road operation, for the purpose that the build-up of the yawing moment is delayed and thus the reaction with the steering is made easier for the driver in case of a braking based on different frictional values of the road, on the right and left side, representing a $\mu$ split. A modified individual control logic, however, does not furnish a particular advantage in all-terrain or cross-country driving.

The invention all-terrain logic comprises the further feature that, in case of all-wheel driven vehicles, the center differential lock remains switched on during the all-terrain automatic control. This is especially advantageous in case of a braking during a downhill drive. The braking force at the rear axle, reduced by an automatic load proportioning valve (load-sensed braking) is not sufficient to lock the rear axle wheels in this case, whereby the desired wedge formation in front of the rear wheels would not occur. For these reasons, a brake force coupling between the front axle and the rear axle is desirable in contrast to a standard road anti-lock system automatic control.

In case of a switched-on all-terrain switch 13, an anti-lock system warning lamp 14 is controlled at intervals, i.e., in flashing operation, in order to indicate to the driver the switched-on state of the all-terrain logic. The driver is thereby reminded, that the vehicle wheels can reach a locked state over short periods of time. If the vehicle is again driven on a normal road, then the all-terrain switch is to be switched into a normal position in order to avoid damages to the tires.

It will be understood that each of the elements described above, or two or more together, may also find a useful application in other types of logic control system configurations and in braking systems differing from the types described above.

While the invention has been illustrated and described as embodied in the context of a control logic for an anti-lock vehicle brake system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for controlling brakes of an anti-lock protected vehicle braking system comprising generating signals within an electronic device for a wheel deceleration, a wheel acceleration, and a wheel slip said electronic device having a standard automatic control logic for modulating brake pressure during time periods under normal operating conditions of the vehicle and having a special automatic control logic for modulating brake pressure during an all-terrain operating state of the vehicle;

switching to the special automatic control logic on with an all-terrain switch, wherein the special automatic control logic is furnished for all-terrain operation; generating additional time periods with the special automatic control logic during which a short-term locking of the automatically controlled wheels occurs based on signals furnished by the special automatic control logic to thereby modulate the brake pressure.

2. The method for controlling the brakes according to claim 1 further comprising
programming a microprocessor contained in the special automatic control logic.

3. The method for controlling the brakes according to claim 1 further comprising
setting the time periods for the locking generated by the special automatic control logic to a constant time duration.

4. The method for controlling the brakes according to claim 3, wherein the time periods for the locking amount to a time period from about 100 to 400 ms.

5. The method for controlling the brakes according to claim 3, wherein the time periods of the locking amount to a time period from about 200 to 300 ms.

6. The method for controlling the brakes according to claim 1 further comprising setting the special automatic control logic for all-terrain operation such that said special automatic control logic becomes effective only at a speed below a preset reference vehicle speed and such that the standard automatic control logic for road operation remains effective above the preset reference speed.

7. The method for controlling the brakes according to claim 6, wherein the preset reference vehicle speed amounts to from about 35 to 45 km/h.

8. The method for controlling the brakes according to claim 1 further comprising
increasing a brake pressure in a wheel brake cylinder and engaging the wheel with a brake lining during an occurrence of a wheel deceleration signal.

9. The method for controlling the brakes according to claim 8 further comprising
entering a pressure maintenance phase of the brake pressure in the wheel brake cylinder for a time period of from about 100 to 150 ms following to a drop of the wheel deceleration signal.

10. The method for controlling the brakes according to claim 9 further comprising
reducing the brake pressure in the wheel brake cylinder quickly after expiration of the pressure maintenance phase; then maintaining the brake pressure in the wheel brake cylinder at a reduced level for a certain time period;
thereupon slowly building up the brake pressure in the wheel brake cylinder by pulsing the brake pressure up to an occurrence of the next wheel deceleration signal.

11. The method for controlling the brakes according to claim 1 further comprising
entering a complete brake pressure into the wheel brake cylinder in case of a wheel speed of below about 10 to 20 km/h; and
blocking the anti-lock automatic control below a wheel speed of from about 10 to 20 km/h.

12. The method for controlling the brakes according to claim 1 further comprising
suspending a modified individual control connection to front wheels.

13. The method for controlling the brakes according to claim 1 further comprising
powering an anti-lock system warning lamp for time intervals during which an all-terrain switch is switched to ON.

14. The method for controlling the brakes according to claim 1 further comprising
maintaining a longitudinal differential blocking switched on in an all-wheel drive vehicle while an all-terrain switch is placed into an ON-state.

15. An automatic control circuit for an anti-lock protected vehicle braking system comprising
a wheel speed sensor having an output and for monitoring the wheel speed and for delivering a signal corresponding to the wheel speed through said output;
a signal processing stage having an input connected to the output of the wheel speed sensor for generating signals corresponding to a wheel deceleration, a wheel acceleration, and a wheel slip, said signal processing stage having a standard automatic control logic for modulating brake pressure during time periods under normal operating conditions of the vehicle and having a special automatic control logic for modulating brake pressure during an all-terrain operating state of the vehicle and wherein the special automatic control circuit is adapted to control all-terrain operation;
an all-terrain switch connected to the signal processing stage, wherein the driver can switch on the special automatic control circuit with the all-terrain switch;

control means for actuating the special automatic control circuit such that additional time periods are generated during which a short-term locking of an automatically controlled wheel occurs to thereby modulate a brake pressure.

16. The automatic control circuit according to claim 15, wherein the time periods provided by the special automatic control circuit for the locking exhibit a constant time duration.

17. The automatic control circuit according to claim 16, wherein the time periods for the locking amount to a time period from about 100 to 400 ms.

18. The automatic control circuit according to claim 16, wherein the time periods of the locking amount to a time period from about 200 to 300 ms.

19. The automatic control circuit according to claim 16, wherein the special automatic control circuit for all-terrain operation becomes effective only below a preset reference vehicle speed, and wherein a standard automatic control logic for road operation remains effective above the preset reference speed.

20. The automatic control circuit according to claim 19, wherein the preset reference vehicle speed amounts to from about 35 to 45 km/h.

21. The automatic control circuit according to claim 15 further comprising
a valve connected to the signal processing stage and actuated by the signal processing stage;
wheel brake cylinders connected to the valve such that a brake pressure is maintained in the wheel brake cylinders during the occurrence of a wheel deceleration signal in the signal processing stage.

22. The automatic control circuit according to claim 21, wherein a pressure maintenance phase, amounting to a time period of from about 100 to 150 ms, is furnished by the signal processing stage following to a drop of the wheel deceleration signal.

23. The automatic control circuit according to claim 22, wherein after expiration of the pressure maintenance phase, the pressure is quickly reduced based on signals from the signal processing stage and then maintained at a reduced level and thereupon is slowly built by pulsing up to the occurrence of the next wheel deceleration signal.

24. The automatic control circuit according to claim 15, wherein the signal processing stage induces a feeding of the complete brake pressure into the wheel brake cylinder in case of a wheel speed of below about 10 to 20 km/h, and wherein the anti-lock automatic control is blocked for wheel speeds lower than a defined wheel speed of between about 10 to 20 km/h.

25. The automatic control circuit according to claim 15, wherein a modified individual control connection to front wheels is suspended.

26. The automatic control circuit according to claim 15 further comoprising
an all-terrain switch for activating the special automatic wheel control circuit;
an anti-lock system warning lamp connected to the all-terrain switch, which warning lamp is to be powered on during time intervals where the all-terrain switch is in an ON-state.

27. The automatic control circuit according to claim 15, wherein a longitudinal differential blocking remains switched on in case the actuated all-terrain switch is turned on in an all-wheel drive vehicle.

28. The automatic control circuit according to claim 15;

wherein the time periods provided by the special automatic control circuit for the locking exhibit a constant time duration;
wherein the time periods for the locking amount to a time period from about 100 to 400 ms;
wherein the special automatic control circuit for all-terrain operation becomes effective only below a preset reference vehicle speed;
wherein the standard automatic control logic for road operation remains effective above the preset reference speed;
wherein the preset reference vehicle speed amounts to from about 35 to 45 km/h; further comprising
a valve connected to the signal processing stage and actuated by the signal processing stage; wheel brake cylinders connected to the valve such that a brake pressure is maintained in the wheel brake cylinders during the occurrence of a wheel deceleration signal in the signal processing stage;
wherein a pressure maintenance phase, amounting to a time period of from about 100 to 150 ms, is furnished by the signal processing stage following to a drop of the wheel deceleration signal;
wherein after expiration of the pressure maintenance phase, the pressure is quickly reduced based on signals from the signal processing stage and then maintained at a reduced level and thereupon is slowly built up by pulsing up to the occurrence of the next wheel deceleration signal;
wherein the signal processing stage induces a feeding of the complete brake pressure into the wheel brake cylinder in case of a wheel speed of below about 10 to 20 km/h, and wherein the anti-lock automatic control is blocked for wheel speeds lower than a defined wheel speed of between about 10 to 20 km/h;
wherein a modified individual control connection to front wheels is suspended; further comprising
an anti-lock system warning lamp connected to the all-terrain switch, which warning lamp is to be powered on during time intervals where the all-terrain switch is in an ON-state;
wherein a longitudinal differential blocking remains switched on in case the actuated all-terrain switch is turned on in an all-wheel drive vehicle.

29. An automatic control logic for an anti-lock protected vehicle braking system, wherein signals are generated within the electronic device for a wheel deceleration, a wheel acceleration, and a wheel slip, said electronic device including a standard automatic control logic for modulating brake pressure during time periods under normal operating conditions of the vehicle and having a special automatic control logic for modulating brake pressure during an all-terrain operating state of the vehicle, wherein the additional special automatic control logic and, a special programming part, respectively, is furnished for all-terrain operation, which special automatic control logic is switched on by a driver with an all-terrain switch (13) to thereby modulate the brake pressure, and which special automatic control logic is formed such that additional time periods are generated during which a short-term locking of the automatically controlled wheels (12) occurs.

30. The automatic control logic according to claim 29, wherein the time periods for the locking exhibit a constant time duration.

31. The automatic control logic according to claim 30, wherein the time periods for the locking amount to a time period from about 100 to 400 ms.

32. The automatic control logic according to claim 30, wherein the periods of the locking amount to a time period from about 200 to 300 ms.

33. The automatic control logic according to claim 29, wherein the special automatic control logic for all-terrain operation becomes effective only below a preset reference vehicle speed, and wherein the standard automatic control logic for road operation remains effective above the preset reference speed.

34. The automatic control logic according to claim 33, wherein the vehicle speed amounts to from about 35 to 45 km/h.

35. The automatic control logic according to claim 29, wherein a brake pressure is maintained in the wheel brake cylinders during the occurrence of a wheel deceleration signal.

36. The automatic control logic according to claim 35, wherein a pressure maintenance phase is entered for a time period of from about 100 to 150 ms following to a drop of the wheel deceleration signal.

37. The automatic control logic according to claim 36, wherein after expiration of the pressure maintenance phase, the pressure is quickly reduced and maintained at a reduced level and thereupon is slowly built by pulsing up to the occurrence of a subsequent wheel deceleration signal.

38. The automatic control logic according to claim 35, wherein the complete brake pressure is entered into the wheel brake cylinders in case of a wheel speed of below about 10 to 20 km/h, and wherein the anti-lock automatic control is blocked at a wheel speed of between about 10 to 20 km/h.

39. The automatic control logic according to claim 29, wherein a modified individual control connection to front wheels is suspended.

40. The automatic control logic according to claim 29, wherein an anti-lock system warning lamp (14) is powered in time intervals during an ON-state of the all-terrain switch (13).

41. The automatic control logic according to claim 29 for all-wheel drive vehicles, wherein the longitudinal differential blocking remains switched on in case of an actuated all-terrain switch (13).

* * * * *